July 16, 1935.  H. R. HAAS  2,008,250
FISH LURE
Filed Sept. 21, 1933
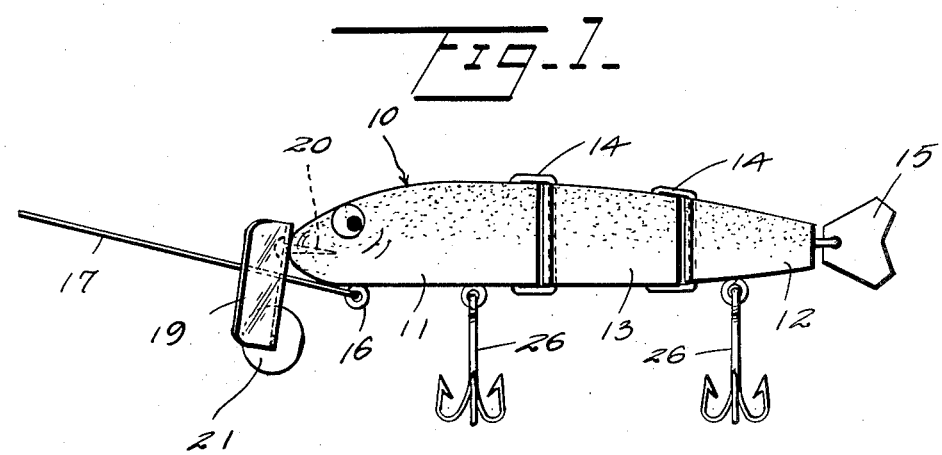
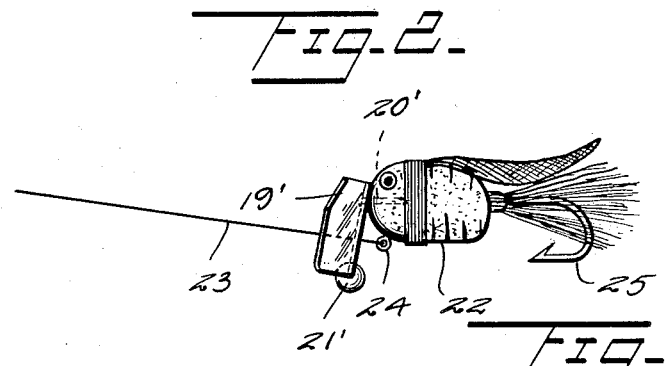
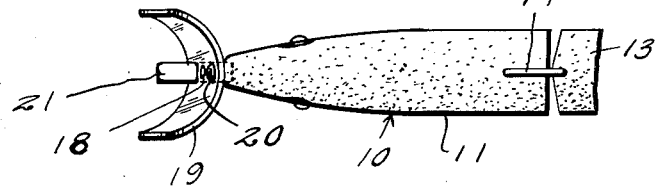
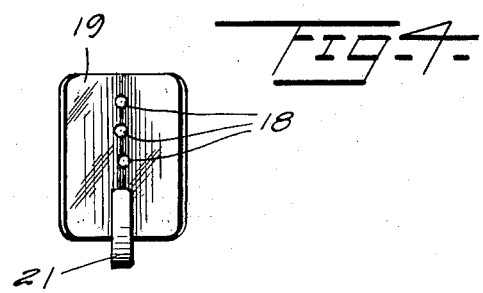
Inventor
H. R. Haas
By Watson E. Coleman
Attorney Patented July 16, 1935

2,008,250

UNITED STATES PATENT OFFICE 2,008,250

FISH LURE

Harry R. Haas, Sapulpa, Okla.

Application September 21, 1933; Serial No. 690,473

9 Claims. (Cl. 43—46)

This invention relates to fish lures, and more particularly to an attachment for a fish lure whereby the lure will, upon being drawn through the water, assume an irregular path simulating the movement of a minnow or other lure.

An object of this invention is to provide an attachment for a fish lure which may be mounted on any conventional lure, the attachment causing the lure to assume substantially the natural movement of the minnow or insect so as to attract the desired fish.

The above and various other objects and advantages of this invention will in part be described and in part be understood from the following detailed description of the present preferred embodiment, the same being illustrated in the accompanying drawing wherein:—

Figure 1 is a detail side elevation of one form of fish lure such as a minnow having a device constructed according to the embodiment of this invention mounted thereon.

Figure 2 is another form of lure having a similar device mounted thereon.

Figure 3 is a fragmentary top plan view of the minnow structure disclosed in Figure 1.

Figure 4 is a detail front elevation of the lure attachment.

Referring to the drawing wherein like numerals of reference indicate corresponding parts throughout the several views, the numeral 10 designates generally a fish lure simulating a minnow and including an articulated body having a front or head section 11, a rear section 12 and an intermediate section 13, each of these sections being jointed together by means of articulated joint structures 14. A tail section 15 is swingably mounted on the rear portion 12 and is adapted to swing from side to side as the lure 10 is drawn through the water. An eye 16 is disposed on the lower side of the front section 11, and a fish line 17 is attached to this eye. Preferably, this eye is disposed a slight distance rearwardly of the front end of the lure 10, and the line 17 is projected through a selected opening 18 in a curved lure directing member 19.

This member 19 is relatively long and attached to the forward end of the minnow 10 by means of a securing member in the form of a screw 20 or the like, which engages the lure directing member 19 adjacent the upper end thereof. This member 19 is mounted in a forwardly and downwardly inclined position relative to the longitudinal axis of the lure 10 and with its axis of curvature in the plane of the axes of the articulated joint structures 14. In the present instance, the member 19 is substantially semi-cylindrical plate constructed of relatively transparent material and is provided adjacent the lower end thereof with a weight 21. This weight 21 coacts with the concavity and forward inclination of the member 19 in causing the lure 20 to assume a downward direction as it is being drawn through the water or the water moves relative to the lure notwithstanding the fact that the line 17 is pulling the front end of the lure upwardly.

The primary object of the weight 21 is to maintain the lure in upright position so that it will not rotate as it moves through the water and the curved member 19 acts to give a swinging motion to the tail section of the lure as well as the body section.

In cases where a lure is used without the attachment herein disclosed, when the line 17 is drawn upwardly, the forward end of the lure 10 naturally assumes the same direction as the line 17 and will be drawn upwardly therewith, whereas by using the weighted attachment 19, the lure 10 will assume a downward direction under the action of the member 17 in addition to a side to side movement caused by the wings of the member 19.

In Figure 2, there is disclosed another type of lure in the form of a top water bug 22 having a line 23 attached to an eye 24 on the lower front side thereof. This lure 22 has a lure directing member 19' secured as by a securing member 20' to the front end thereof, and this member 19' has a weighted lower end portion 21'. The lure disclosed in Figure 2 has a hook 25 extending rearwardly therefrom and this lure is adapted to be drawn along the surface of the water. By reason of the attachment 19' on the lure 22, the top water bug will assume a downward movement and the weight 21' will not only facilitate this movement but will have a tendency to maintain the equilibrium of the bug as it is being drawn through the water.

In the use of the attachment herein disclosed, where the lure shown in Figure 1 is used, the line 17 is disposed through the selected opening 18 in the plate member 19. This lure 10 has, in the present instance, a plurality of hooks 26 depending from the lower side thereof. By selecting the desired opening 18 in the member 19, the lure 10 can be made to assume the desired downward movement in addition to the side to side movement as it is being moved relative to the water or the water moves relative to the lure.

It will be obvious that the lures shown in Figures 1 and 2 are merely illustrative of two forms of lures to which the device herein disclosed may be attached so as to cause the lure to assume the desired downward movement as it is being drawn relative to the water.

While the attachment herein disclosed is constructed of relatively transparent material, it is apparent that this member 19 can also be constructed of metal having the desired weight, particularly adjacent the lower end portion thereof so as to cause the downward movement of the device.

It is, of course, understood that various changes and modifications may be made in the details of construction and design of the above specifically described embodiment of this invention without departing from the spirit thereof, such changes and modifications being restricted only by the scope of the following claims.

What is claimed is:—

1. In combination, a fish lure, an eye carried by the lure adjacent the forward end thereof and on the lower side of the lure, said eye being adapted to receive one end of a fish line and a lure directing member disposed on the forward end of the lure, said member comprising a transversely curved plate disposed with the concavity foremost, said plate having a plurality of longitudinally spaced openings therethrough, a securing means engaging in the uppermost of said openings and engaging the forward end of the lure to secure the member to the lure in forwardly and downwardly inclined position, the fish line being adapted to be loosely disposed in a selected other opening below said first opening, and a weight carried by the lower portion of said member.

2. An artificial lure for movement through water in simulation of a living lure including an articulated sectional body, a curved member on the body having its axis of curvature extending in a plane common to the axes of articulation of the body when the articulated sections are in alignment whereby resistance of the water against the curved member effects articulatory movement of the body, and means connected with the lure including a line extending through the member for drawing the lure through the water.

3. An artificial lure for movement through water in simulation of a living lure including an articulated sectional body, a curved member on the body having its axis of curvature extending in a plane common to the axes of articulation of the body when the articulated sections are in alignment and with its concave side foremost whereby resistance to the water against the curved member effects articulatory movement of the body, means on the lure and located below said articulated body to attach a line for drawing the lure through the water, and means for preventing rotational movement of the body incidental to the action of the water against said member.

4. An artificial lure for movement through water in simulation of a living lure including an articulated sectional body, a substantially semi-cylindrical member incliningly disposed on the body with its axis of curvature extending in a plane common to the axes of articulation of the body when the articulated sections are in alignment whereby resistance of the water against the curved member effects articulatory movement of the body, and means connected with the lure including a line extending through the member for drawing the lure through the water.

5. An artificial lure for movement through water in simulation of a living lure including an articulated sectional body, a substantially semi-cylindrical plate having a series of openings therein, means securing the plate to the foremost end of the lure with its axis inclined in a plane common to the axes of articulation of the body when the articulated sections are in alignment and with the concavity of the plate foremost whereby the resistance of the water against the plate effects articulatory movement of the body, means on the lure including a line extending through one of said openings in the plate for drawing the lure through the water, and means on the lure for preventing rotational movement of the body incidental to action of the water against said plate.

6. An artificial lure for movement through water in simulation of a living lure including an articulated sectionl body, a curved plate having an opening therein, means securing the plate to the foremost end of the lure with its axis inclined in a plane common to the axes of articulation of the body when the articulated sections are in alignment and with the concave side of the plate foremost whereby resistance of the water against the plate effects articulatory movement of the body, a line secured to the body and extending through said opening in the plate for drawing the lure through the water, and a weight depending from the lure to retain the lure in balanced position while being drawn through the water.

7. An artificial lure for movement through water in simulation of a living lure including a body, a curved plate fixed to the body with its axis of curvature inclined to the direction of movement of the lure and with its concave side foremost whereby resistance of the water against the plate effects side to side movement of the body, means on the lure for preventing rotational movement of the body incidental to action of the water against said plate, and means on the lure to attach a line for drawing the lure through the water.

8. An artificial lure for movement through water in simulation of a living lure including a body, a substantially semi-cylindrical plate having a series of openings therein, means for securing the plate to the foremost end of the body with its axis inclined relative to the longitudinal axis of the body and with its concave side foremost whereby resistance of the water against the plate effects side to side movement of the body, a weight on the lure for retaining the lure in balanced position while being drawn through the water, and a line secured to the lure and extending through one of the openings in the plate for drawing the lure through the water.

9. In combination, a fish lure, means for securing a line to the lure, a lure directing member comprising a transversely curved plate having an opening, means for securing the plate to the foremost end of the body with its axis inclined in a plane relative to the longitudinal axis of the body and with the concavity of the plate foremost whereby resistance of the water against the plate effects zig-zag movement of the body through the water, a line secured to said line securing means and adapted to be loosely disposed in said opening, and a weight disposed below the axis of the body to retain the lure in balanced position while being drawn through the water.

HARRY R. HAAS.